(12) United States Patent
Yu et al.

(10) Patent No.: US 8,497,482 B2
(45) Date of Patent: Jul. 30, 2013

(54) RADIATION DETECTOR MODULE

(75) Inventors: Juhyun Yu, Mito (JP); Yoshinori Sunaga, Hitachinaka (JP); Naoyuki Yamada, Hitachinaka (JP); Shinichi Inoue, Ryugasaki (JP); Isao Takahashi, Hitachi (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 276 days.

(21) Appl. No.: 12/842,456

(22) Filed: Jul. 23, 2010

(65) Prior Publication Data

US 2011/0192983 A1 Aug. 11, 2011

(30) Foreign Application Priority Data

Feb. 8, 2010 (JP) ................................. 2010-025707

(51) Int. Cl.
*G01T 1/24* (2006.01)
(52) U.S. Cl.
USPC ..................................................... 250/370.01
(58) Field of Classification Search
USPC .......... 250/370; 257/11, 21, 53–56, 113–118, 257/184–189, 225–234, 257–258, 290–294, 257/414–466
See application file for complete search history.

(56) References Cited

U.S. PATENT DOCUMENTS

| | | | |
|---|---|---|---|
| 6,621,084 B1 * | 9/2003 | Amrami et al. | .......... 250/370.09 |
| 7,279,683 B2 | 10/2007 | Kuroda et al. | |
| 2002/0148967 A1 * | 10/2002 | Iwanczyk et al. | ........ 250/370.11 |
| 2004/0001570 A1 | 1/2004 | Kuroda et al. | |
| 2006/0001570 A1 * | 1/2006 | Salas et al. | ............... 342/357.17 |

FOREIGN PATENT DOCUMENTS

JP 2003-315465 11/2003

* cited by examiner

*Primary Examiner* — Michael G Lee
*Assistant Examiner* — Matthew Mikels
(74) *Attorney, Agent, or Firm* — Crowell & Moring LLP

(57) ABSTRACT

A radiation detector module includes a radiation detecting substrate including a plurality of semiconductor devices mounted thereon for detecting radiation, a fixing member for holding the radiation detecting substrate, and a circuit substrate connected to the radiation detecting substrate. The radiation detecting substrate further includes a mounting board including an edge portion connected to the circuit substrate at one end thereof, and a flexible substrate including a wiring pattern connected to the plurality of semiconductor devices. The fixing member includes a bottom, a first side wall extending in a normal direction to the bottom from one end of the bottom, a second side wall extending in the normal direction to the bottom from the other end of the bottom, and substrate supporting portions on the first side wall and the second side wall.

5 Claims, 17 Drawing Sheets

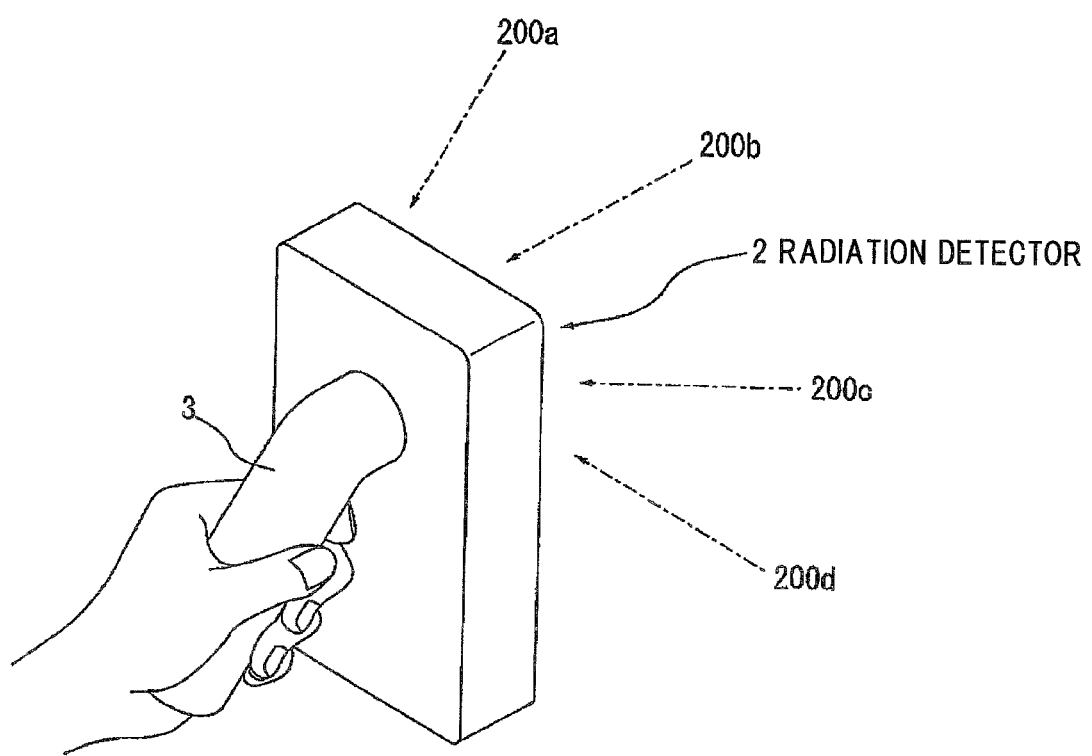

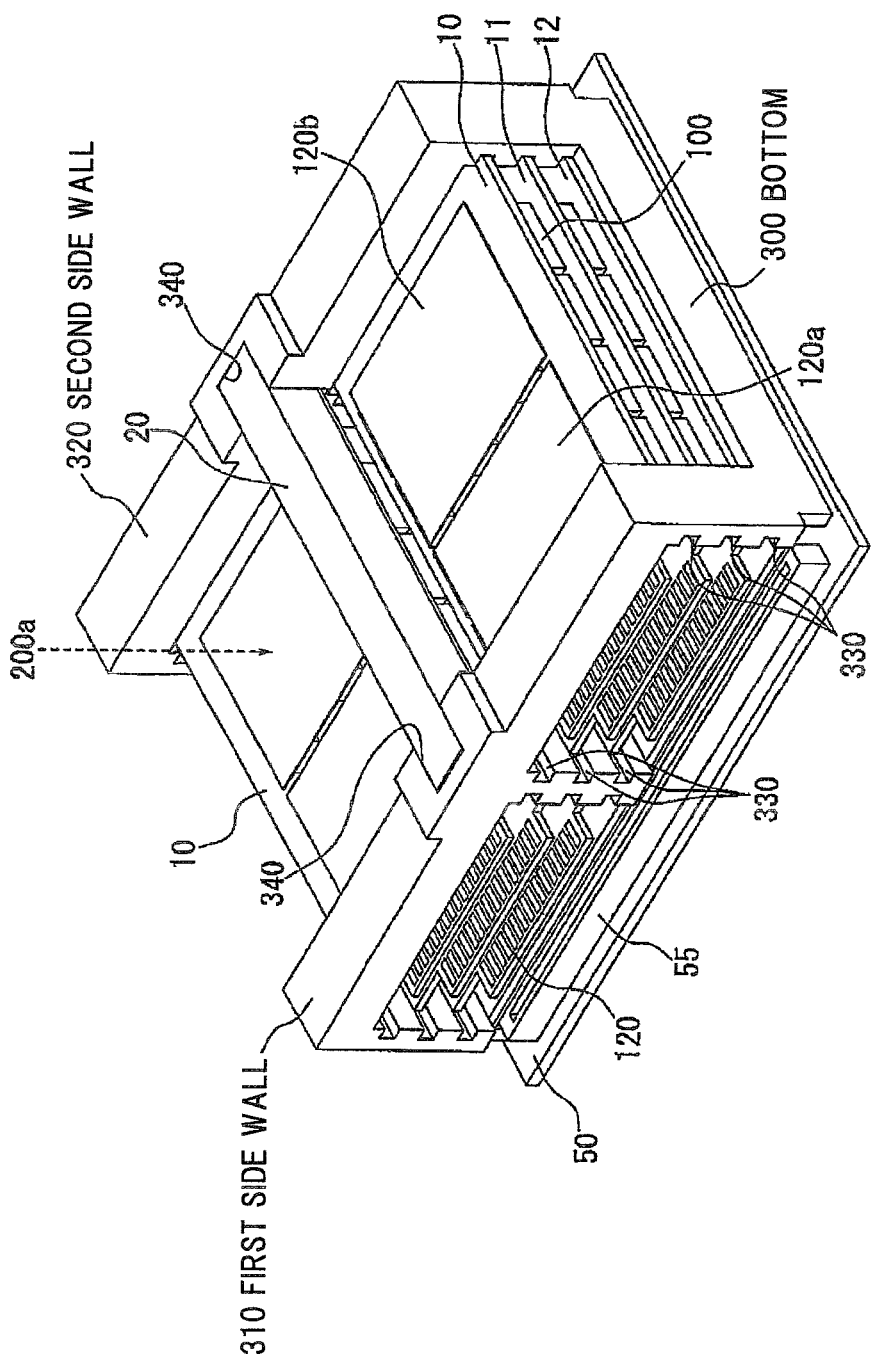

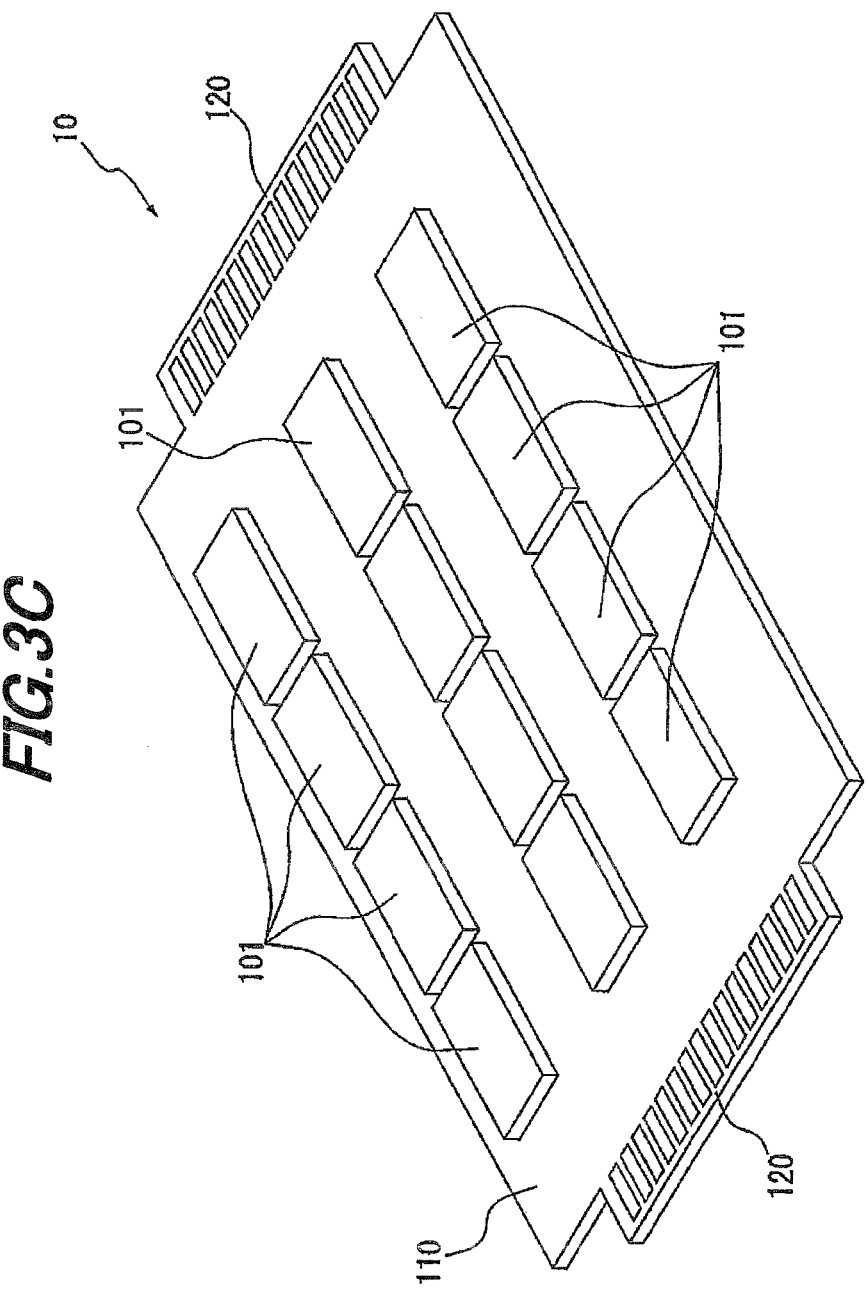

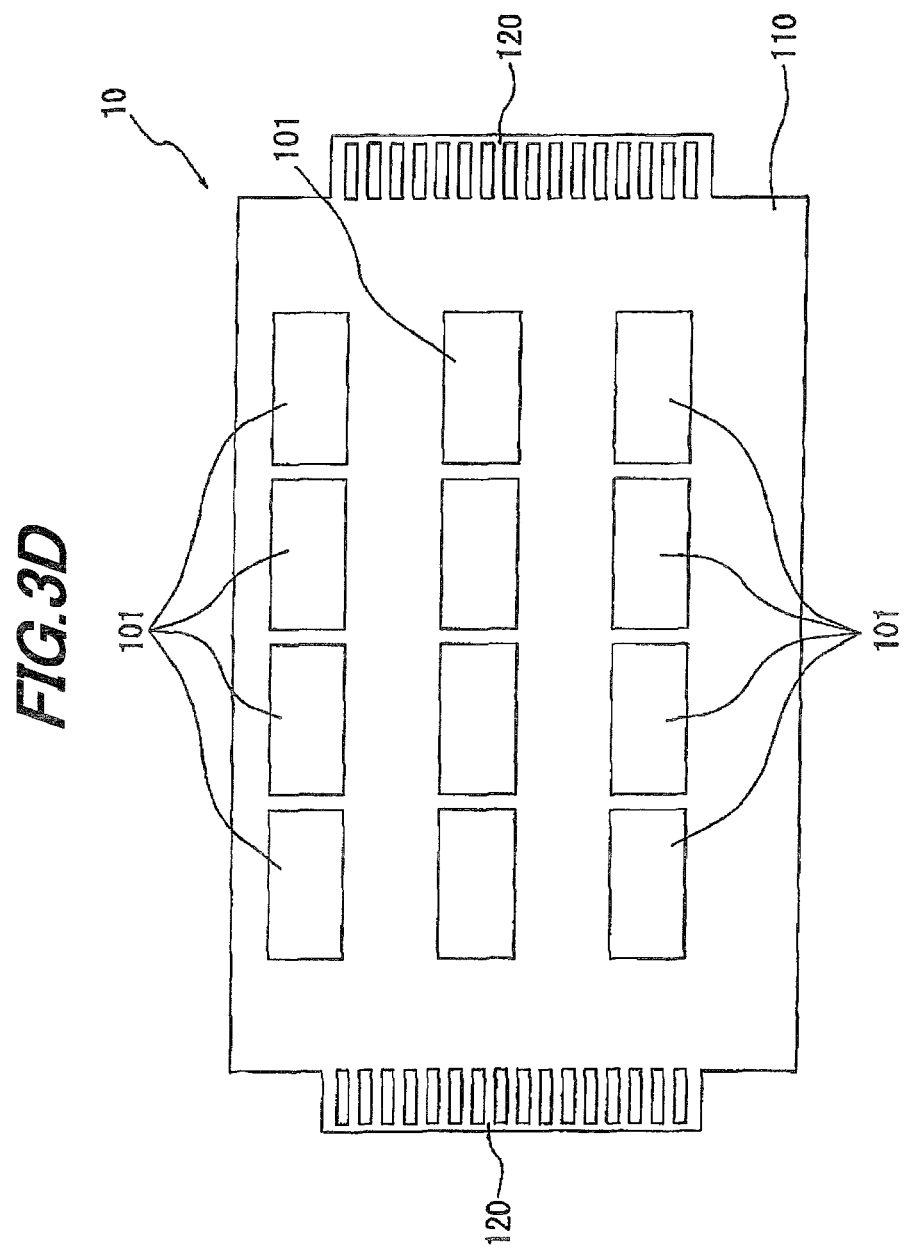

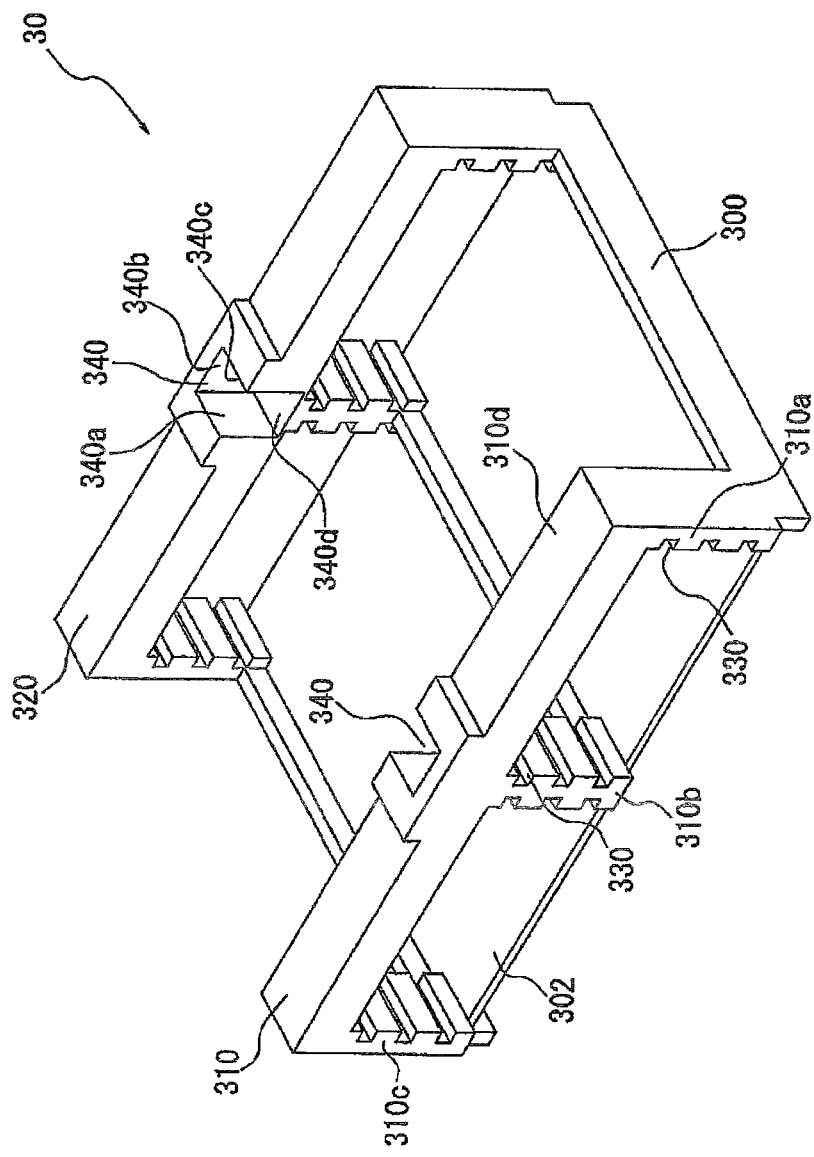

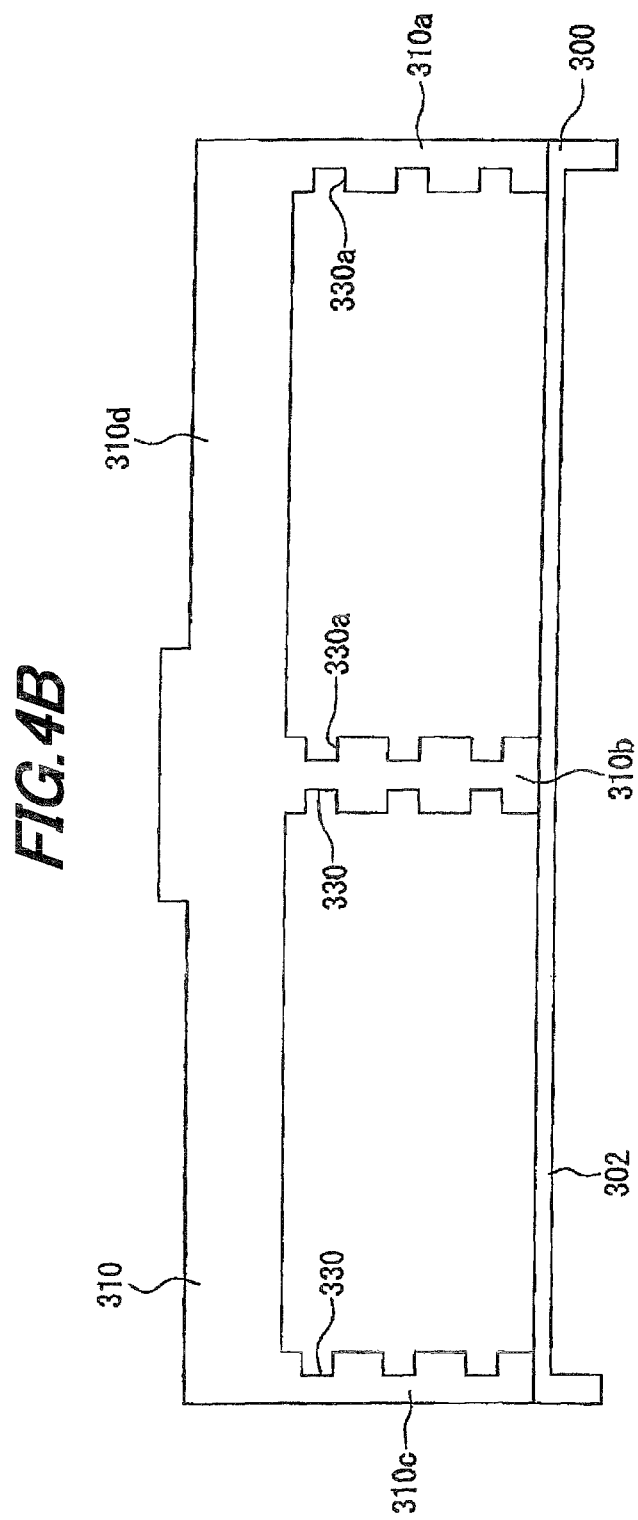

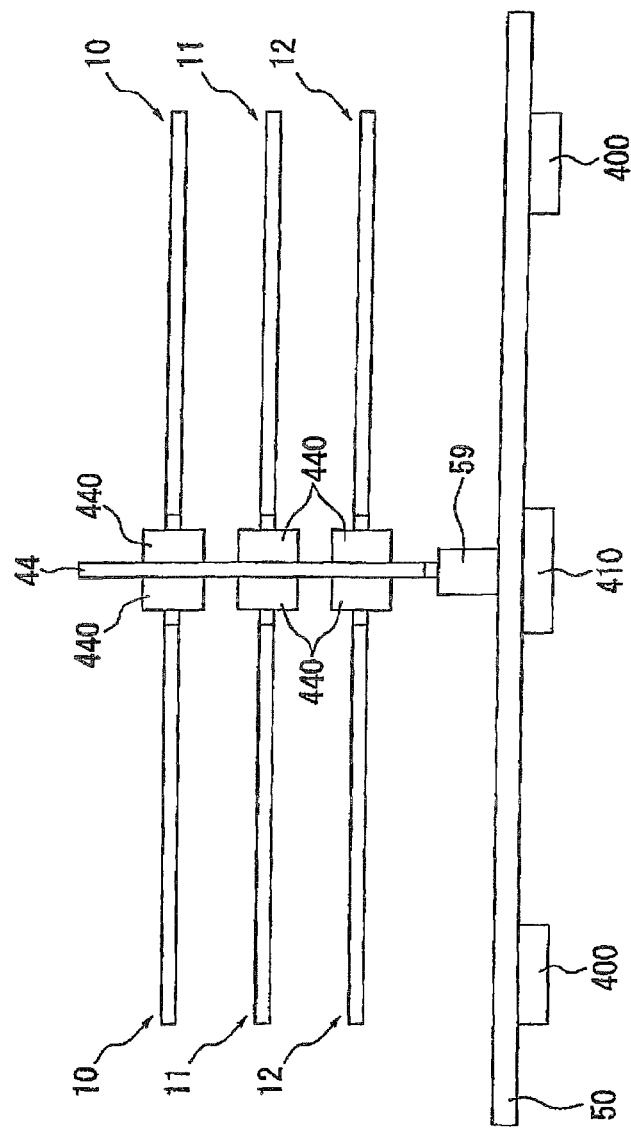

RADIATION DETECTOR MODULE

The present application is based on Japanese patent application No. 2010-025707 filed on Feb. 8, 2010, the entire contents of which are incorporated herein by reference.

BACKGROUND OF THE INVENTION

1. Field of the Invention

The present invention relates to a radiation detector module and, in particular, to a radiation detector module that can apply to a portable radiation detector.

2. Description of the Related Art

Conventionally, a gamma ray source distance measuring device is known that is equipped with a multilayer radioactive radiation detector having a plurality of detecting plates disposed in a normal direction for detecting incident radioactive rays, electric charge collecting means provided for the plural detecting plates respectively for collecting electric charges produced for each detecting plate, incidence number detecting means for counting the electric charges for each detecting plate collected by each electric charge collecting means and thereby detecting the number of incident radioactive rays for each detecting plate, and a distance computing means for computing a distance to the radioactive ray source based on the number of incident radioactive rays for each detecting plate and each distance between the adjacent detecting plates of the plural detecting plates (See, e.g., JP-A-2003-315465).

The gamma ray source distance measuring device as disclosed in JP-A-2003-315465 allows the high precision measurement of a direction in which the radioactive ray source exists, or a distance to the radioactive ray source.

However, because the gamma ray source distance measuring device as disclosed in JP-A-2003-315465 is constructed to have screw holes in its mounting substrates for mounting the detecting plates, respectively, and a guide shaft passed through these screw holes to thereby stack the plural detecting plates, it is difficult to remove or adjust only a particular detecting plate of the plural detecting plates.

SUMMARY OF THE INVENTION

Accordingly, it is an object of the present invention to provide a radiation detector module that is excellent in assembling capability.

(1) According to an embodiment of the invention, a radiation detector module comprises:

a radiation detecting substrate comprising a plurality of semiconductor devices mounted thereon for detecting radiation, the plural semiconductor devices each comprising a first electrode on one surface thereof and a second electrode on an other surface thereof;

a fixing member for holding the radiation detecting substrate; and a circuit substrate connected to the radiation detecting substrate, wherein the radiation detecting substrate further comprises: a mounting board comprising an edge portion connected to the circuit substrate at one end thereof, the plurality of semiconductor devices being connected to the mounting board via the first electrode; and a flexible substrate comprising a wiring pattern connected to the second electrode of the plurality of semiconductor devices, wherein the fixing member comprises: a bottom; a first side wall extending in a normal direction to the bottom from one end of the bottom; a second side wall extending in the normal direction to the bottom from the other end of the bottom; and substrate supporting portions on the first side wall and the second side wall, respectively, the substrate supporting portions supporting the radiation detecting substrate, and wherein the circuit substrate is electrically connected to the plurality of semiconductor devices via the edge portion of the radiation detecting substrate.

In the above embodiment (1) of the invention, the following modifications and changes can be made.

(i) The plurality of semiconductor devices are arranged at intervals along one side of the mounting board and an other side perpendicular to the one side in top view.

(ii) The circuit substrate comprises a first circuit substrate and a second circuit substrate connected to both ends, respectively, of the radiation detecting substrate, the mounting board includes a first edge portion connected to the first circuit substrate at one end of the mounting board, and a second edge portion connected to the second circuit substrate at an other end of the mounting board, the plurality of semiconductor devices comprise a plurality of first semiconductor devices electrically connected to the first edge portion, and a plurality of second semiconductor devices electrically connected to the second edge portion, the flexible substrate comprises a first flexible substrate connected to the plurality of first semiconductor devices, and a second flexible substrate connected to the plurality of second semiconductor devices, the first circuit substrate includes an integrated circuit electrically connected to the plurality of first semiconductor devices, the second circuit substrate includes an integrated circuit electrically connected to the plurality of second semiconductor devices, and the radiation detecting substrate is disposed between the first circuit substrate and the second circuit substrate.

(iii) The plurality of first semiconductor devices and the plurality of second semiconductor devices are being electrically disconnected from each other.

(iv) The fixing member further includes:

a shielding material provided at a position nearer to an incident side of the radiation than the radiation detecting substrate, the shielding material capable of shielding the radiation; and a shielding material supporting portion provided at a predetermined position relative to the substrate supporting portion and for supporting the shielding material.

(v) The circuit substrate includes a circuit substrate side connector on each of one side and the other side thereof, and the edge portion of the radiation detecting substrate is inserted in the circuit substrate side connectors.

(vi) The fixing member comprises a resin or metal material.

Points of the Invention

According to one embodiment of the invention, a radiation detector module is constructed such that a radiation detecting substrate thereof can be inserted by sliding into the substrate supporting portions formed in the fixing member, thereby allowing the radiation detecting substrate to easily be held by the fixing member. This can aid in assembling the radiation detector module, and allows only the desired radiation detecting substrate to be inserted into or removed from the substrate supporting portions at desired position. It is therefore possible to provide the radiation detector module with excellent assembling capability.

BRIEF DESCRIPTION OF THE DRAWINGS

The preferred embodiments according to the invention will be explained below referring to the drawings, wherein:

FIG. 1 is a schematic view showing a radiation detector with a built-in radiation detector module in an embodiment according to the invention;

FIG. 2B is a perspective view showing the radiation detector module of FIG. 2A, from which circuit substrates have been removed, in the embodiment according to the invention;

FIG. 3C is a perspective view showing the radiation detecting substrate of FIG. 3A included in the radiation detector module, from which flexible substrates have been removed, in the embodiment according to the invention;

FIG. 3D is a plan view showing one side of the radiation detecting substrate of FIG. 3A included in the radiation detector module, from which flexible substrates have been removed, in the embodiment according to the invention;

FIG. 4A is a perspective view showing a fixing member for the radiation detector module in the embodiment according to the invention;

FIG. 4B is a side view showing a fixing member for the radiation detector module in the embodiment according to the invention;

FIG. 9 is a side view showing a radiation detector module in a modification to the embodiment according to the invention.

DETAILED DESCRIPTION OF THE PREFERRED EMBODIMENTS

Summary of the Embodiment

A radiation detector module is comprised of a radiation detecting substrate with plural semiconductor devices mounted thereon for detecting radiation such as gamma rays, X-rays and the like, the plural semiconductor devices each including a first electrode on one surface thereof and a second electrode on the other surface thereof, a fixing member for holding the radiation detecting substrate, and a circuit substrate connected to the radiation detecting substrate. The radiation detecting substrate is comprised of a mounting board having an edge portion connected to the circuit substrate at one end thereof, the plurality of semiconductor devices being connected to the mounting board via the first electrode, and a flexible substrate comprising a wiring pattern connected to the second electrode of the plurality of semiconductor devices. The fixing member is comprised of a bottom, a first side wall extending in a normal direction to the bottom from one end of the bottom, a second side wall extending in the normal direction to the bottom from the other end of the bottom, and substrate supporting portions on the first side wall and the second side wall, respectively, the substrate supporting portions supporting the radiation detecting substrate. The circuit substrate is electrically connected to the plurality of semiconductor devices via the edge portion of the radiation detecting substrate.

Embodiment

Radiation Detector 2

FIG. 1 shows one example of a radiation detector with a built-in radiation detector module in an embodiment according to the invention.

A radiation detector 2 with a built-in radiation detector module 1 in the embodiment of the invention is handy, and capable of probing nuclear materials. Specifically, the radiation detector 2 includes the radiation detector module 1 for detecting radiation 200a to 200d such as gamma rays, X-rays and the like, a data processing unit for processing the detected results of the radiation detector module 1, a communication unit for transmitting the processed results of the data processing unit to an external communication terminal or the like, and a power supply unit for supplying electric power to the data processing unit, etc. The radiation detector 2 is capable of identifying a position of a radiation source for the radiation 200a to 200d such as gamma rays, X-rays and the like. Also, the radiation detector 2 has as small sized a shape as easy to carry. For example, the radiation detector 2 may be provided with a grip 3 and formed in such an easy to carry shape as a substantially rectangular parallelepiped shape (see, for example, FIG. 1), a flashlight-like cylindrical shape (not shown), or the like.

Radiation Detector Module 1 Construction

Figure 2A:
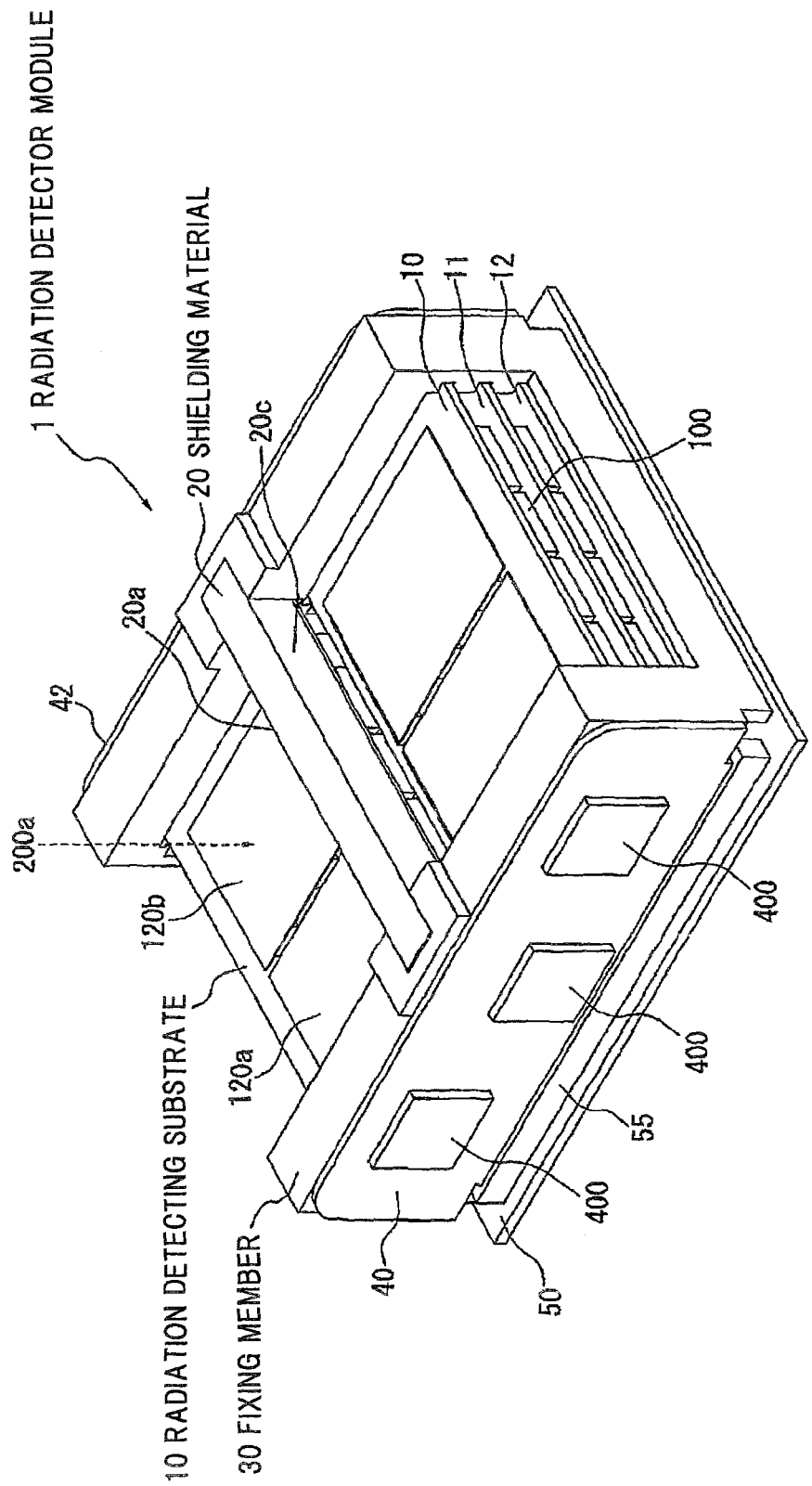
FIG. 2A is a perspective view showing a radiation detector module in the embodiment according to the invention.

FIG. 2A shows one example of a perspective view showing a radiation detector module in the embodiment according to the invention. Further, FIG. 2B shows one example of a perspective view showing the radiation detector module of FIG. 2A, from which circuit substrates have been removed, in the embodiment according to the invention.

The radiation detector module 1 in the embodiment of the invention includes a plurality of card-type radiation detecting substrates (e.g. radiation detecting substrates 10, 11, and 12) each having a plurality of semiconductor devices (e.g. semiconductor devices 100) mounted thereon and capable of detecting radiation, a shielding material 20 capable of shielding a portion of the radiation (e.g. radiation 200a) incident on the radiation detector module 1, and a fixing member 30 for holding at least a peripheral portion of each of the plural radiation detecting substrates, and fixing the shielding material 20 at a predetermined position relative to the plural radiation detecting substrates. The number of radiation detecting substrates is not limited to the above, but may be one or more. In this case, the fixing member 30 is formed according to the number of radiation detecting substrates to be provided in the radiation detector module 1, so that it may hold all the radiation detecting substrates.

Also, the radiation detector module 1 in this embodiment is further provided with first and second circuit substrates 40 and 42 each having a plurality of integrated circuits 400 mounted thereon. Each of edge portions 120 at one end and the other end of each of the plural radiation detecting substrates is electrically connected to the first and second circuit substrates 40 and 42, respectively. The plural radiation detecting substrates are each sandwiched between the circuit substrates 40 and 42. Each of the plural semiconductor devices 100 is then electrically connected to the circuit substrate 40 or the circuit substrate 42 via the edge portions 120 respectively. Further, the radiation detector module 1 is provided with a motherboard 50 having a connector 55 into which the circuit substrate 40 is inserted, and a connector (not shown) into which the circuit substrate 42 is inserted. The connector 55 is provided at one end of the motherboard 50, while the connector into which the circuit substrate 42 is inserted is provided at the opposite end of the motherboard 50.

That is, the radiation detector module 1 is constructed as follows: the fixing member 30 is mounted on the surface of the motherboard 50, the plural radiation detecting substrates and the shielding material 20 are fixed to the fixing member 30, and the circuit substrates 40 and 42, which are connected to each of the plural radiation detecting substrates, are fixed to the motherboard 50. The radiation detector module 1 may further be provided with a case for storing the plural radiation detecting substrates, the shielding material 20, the fixing member 30, the circuit substrates 40 and 42, and the motherboard 50.

Also, the fixing member 30 is formed to have a bottom 300, a first side wall 310 extending in a normal direction to the bottom 300 from one end of the bottom 300, and a second side wall 320 extending in the normal direction (the same direction as the extending direction of the first side wall 310) to the bottom 300 from the other end of the bottom 300 (see FIG. 2B). The first side wall 310 and the second side wall 320 each have a substrate supporting portion 330 for supporting each of the plural radiation detecting substrates, and a shielding material supporting portion 340 for supporting the shielding material 20 provided at a predetermined position relative to the substrate supporting portion 330. This detail will be described later.

Shielding Material 20

The shielding material 20 is provided at a position nearer to the incident radiation side than the radiation detecting substrates (e.g. radiation detecting substrates 10, 11, and 12). For example, the shielding material 20 is provided at a position excluding directly above the plural semiconductor devices (e.g. semiconductor devices 100). Also, the shielding material 20 is formed to have a columnar shape including a flat surface. The shielding material 20 is then formed to contain a material capable of shielding radiation, such as lead or tungsten.

Radiation Detecting Substrate 10

Figure 3A:
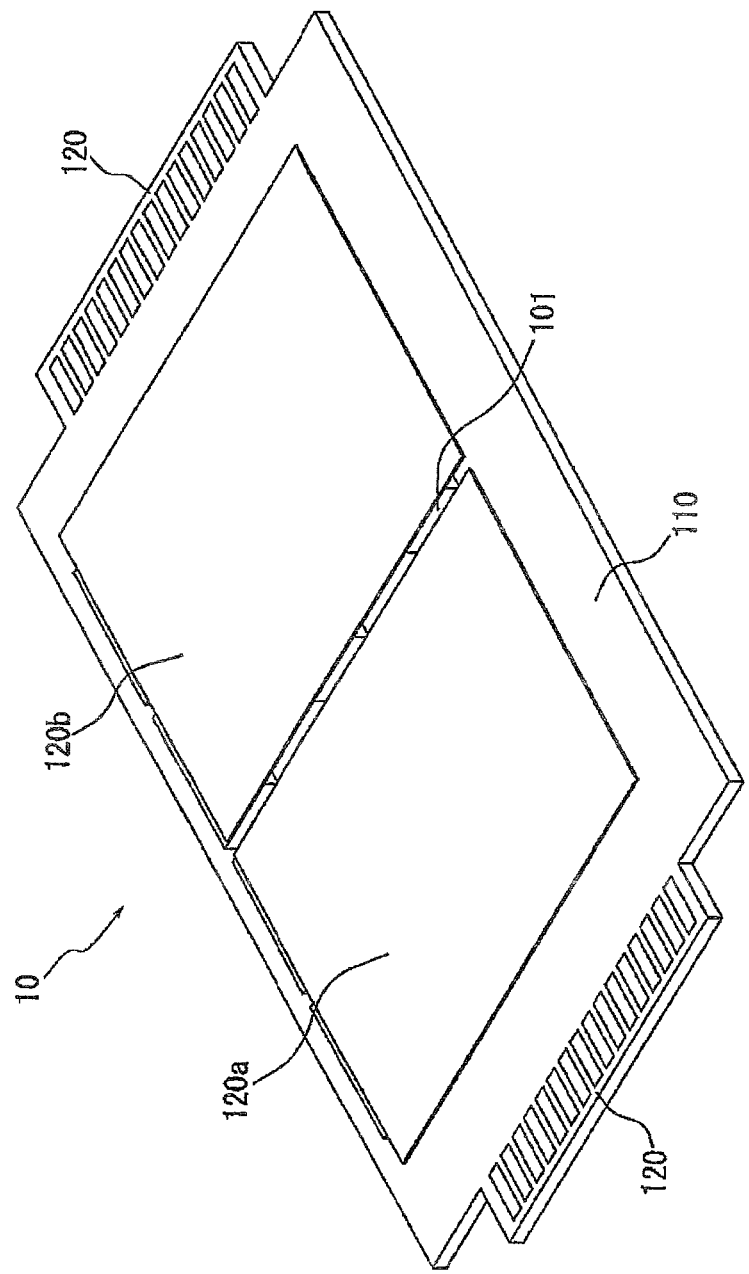
FIG. 3A is a perspective view showing a radiation detecting substrate included in the radiation detector module in the embodiment according to the invention.
Figure 3B:
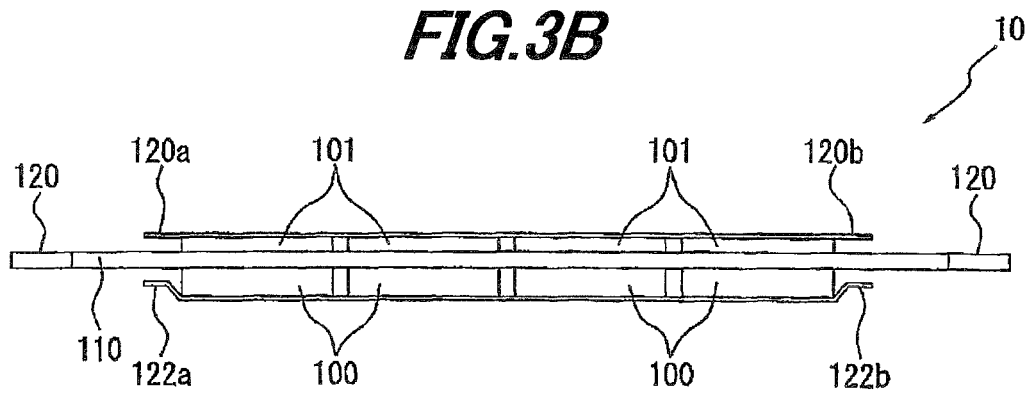
FIG. 3B is a side view showing the radiation detecting substrate of FIG. 3A included in the radiation detector module in the embodiment according to the invention.

FIG. 3A shows one example of a perspective view showing a radiation detecting substrate included in the radiation detector module in the embodiment according to the invention, and FIG. 3B shows one example of a side view showing the radiation detecting substrate included in the radiation detector module in the embodiment according to the invention.

The radiation detecting substrate 10 (herein, also referred to as the first radiation detecting substrate) is constructed of a glass epoxy substrate or the like, and provided with a rigid substrate (or mounting board) 110 which is substantially rectangular in a plan view, edge portions 120 formed at both ends (e.g. both short side ends) of the rigid substrate 110, a plurality of semiconductor devices 101 for detecting first energy mounted on one surface of the rigid substrate 110, and a plurality of semiconductor devices 100 for detecting second energy higher than the first energy mounted on the other surface of the rigid substrate 110. Here, the plural semiconductor devices 101 are provided on the incident radiation side relative to the semiconductor devices 100. Also, the first edge portion 120 at one end of the rigid substrate 110 is connected to the first circuit substrate 40, while the second edge portion 120 at the other end of the rigid substrate 110 is connected to the second circuit substrate 42.

The plural semiconductor devices 100 and the plural semiconductor devices 101 are each provided with a first electrode on a rigid substrate 110 side thereof, which is electrically connected to a wiring portion provided on the rigid substrate 110 beforehand, and a second electrode on the opposite side to the first electrode provided thereon. Also, the number of semiconductor devices 100 and 101 to be provided for the radiation detecting substrate 10 may appropriately be altered according to uses of the radiation detector module 1. Further, the semiconductor devices to be mounted on one surface and the other surface of the rigid substrate 110 may be the same semiconductor device.

Also, the radiation detecting substrate 10 is provided with a first flexible substrate 120a including a wiring pattern to be electrically connected to the respective second electrodes of the plural first semiconductor devices 101 at one edge portion 120, and a second flexible substrate 120b including a wiring pattern to be electrically connected to the respective second electrodes of the plural second semiconductor devices 101 at the other edge portion 120, and the first and second flexible substrates 120a and 120b being not electrically connected with each other.

Likewise, the radiation detecting substrate 10 is provided with a flexible substrate 122a including a wiring pattern to be electrically connected to the plural semiconductor devices 100 at one edge portion 120, and a flexible substrate 122b including a wiring pattern to be electrically connected to the plural semiconductor devices 100 at the other edge portion 120, and the flexible substrates 122a and 122b being not in electrical continuity with each other. The flexible substrates 120a and 122a are then each electrically connected to the circuit substrate 40, while the flexible substrates 120b and 122b are each electrically connected to the circuit substrate 42. This results in the plural semiconductor devices, which are electrically connected to the first edge portion 120, and the plural semiconductor devices, which are electrically connected to the second edge portion 120, being electrically disconnected from each other.

Here, the semiconductor devices 100 and 101 may use CdTe devices, CdZnTe (CZT) devices, HgI$_2$ devices, etc. Also, the semiconductor devices 100 and 101 may each be formed by use of the same or different materials. Further, the semiconductor devices 100 and 101 may be formed in a rectangular or square shape in a plan view. As one example, the thickness of the semiconductor devices may then be varied, to thereby adjust a detectable radiation energy band. In this case, it is preferred to dispose the lower energy radiation detecting semiconductor devices nearer to the incident radiation side.

Figure 3E:
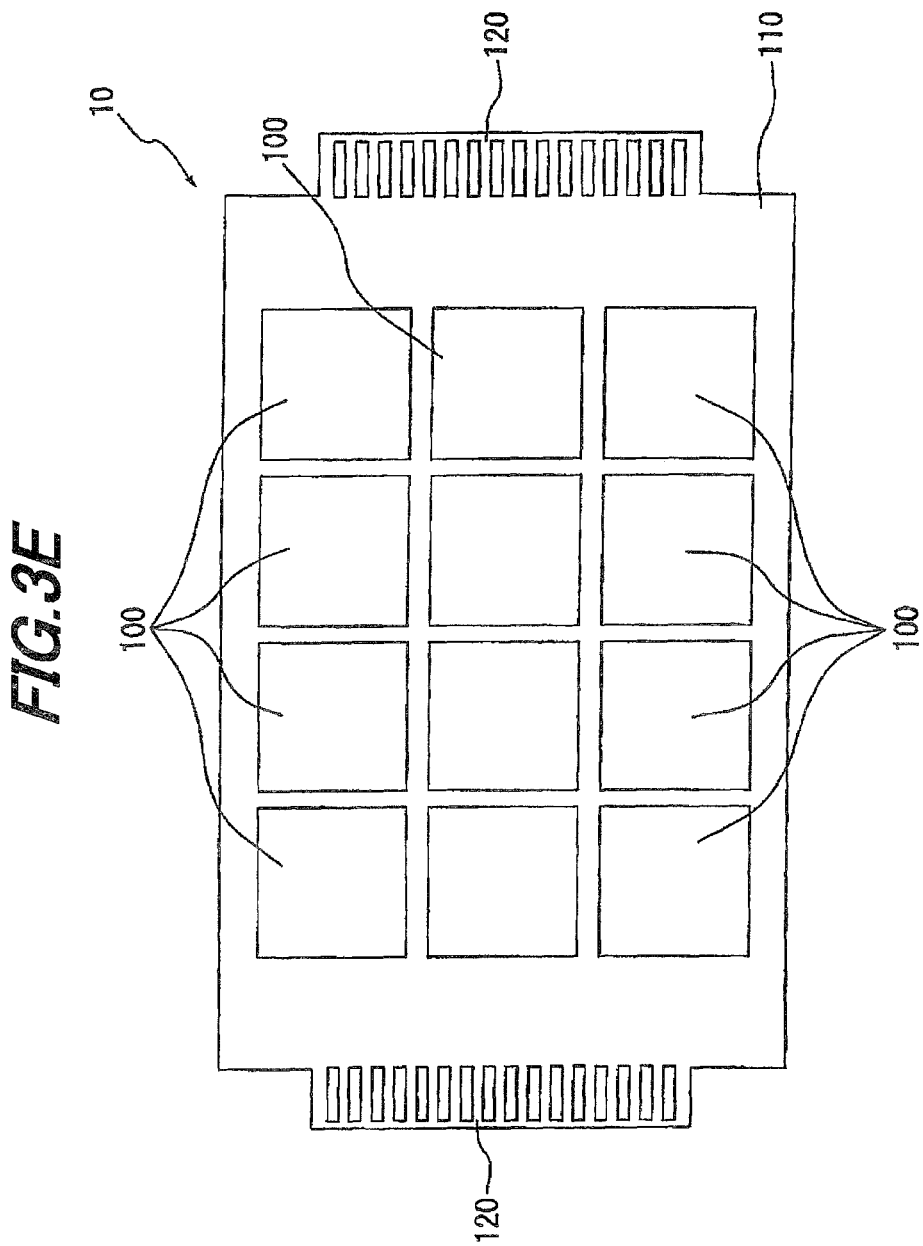
FIG. 3E is a plan view showing the other side of the radiation detecting substrate of FIG. 3A included in the radiation detector module, from which flexible substrates have been removed, in the embodiment according to the invention.

FIG. 3C shows one example of a perspective view showing the radiation detecting substrate included in the radiation detector module, from which flexible substrates have been removed, in the embodiment according to the invention. Also, FIG. 3D shows one example of a plan view showing one side of the radiation detecting substrate included in the radiation detector module, from which flexible substrates have been removed, in the embodiment according to the invention, and FIG. 3E shows one example of a plan view showing the other side of the radiation detecting substrate included in the radiation detector module, from which flexible substrates have been removed, in the embodiment according to the invention.

As shown in FIGS. 3C and 3D, the plural semiconductor devices 101 are arranged in a lattice form in a plan view on one surface of the rigid substrate 110. That is, the plural semiconductor devices 101 are spaced at a predetermined pitch in each of the longitudinal and transverse directions on one surface of the rigid substrate 110. Also, as shown in FIG. 3E, the plural semiconductor devices 100 are likewise spaced at a predetermined pitch in each of the longitudinal and transverse directions on the other surface of the rigid substrate 110.

Radiation Detecting Substrate 11 and/or 12

Figure 3F:
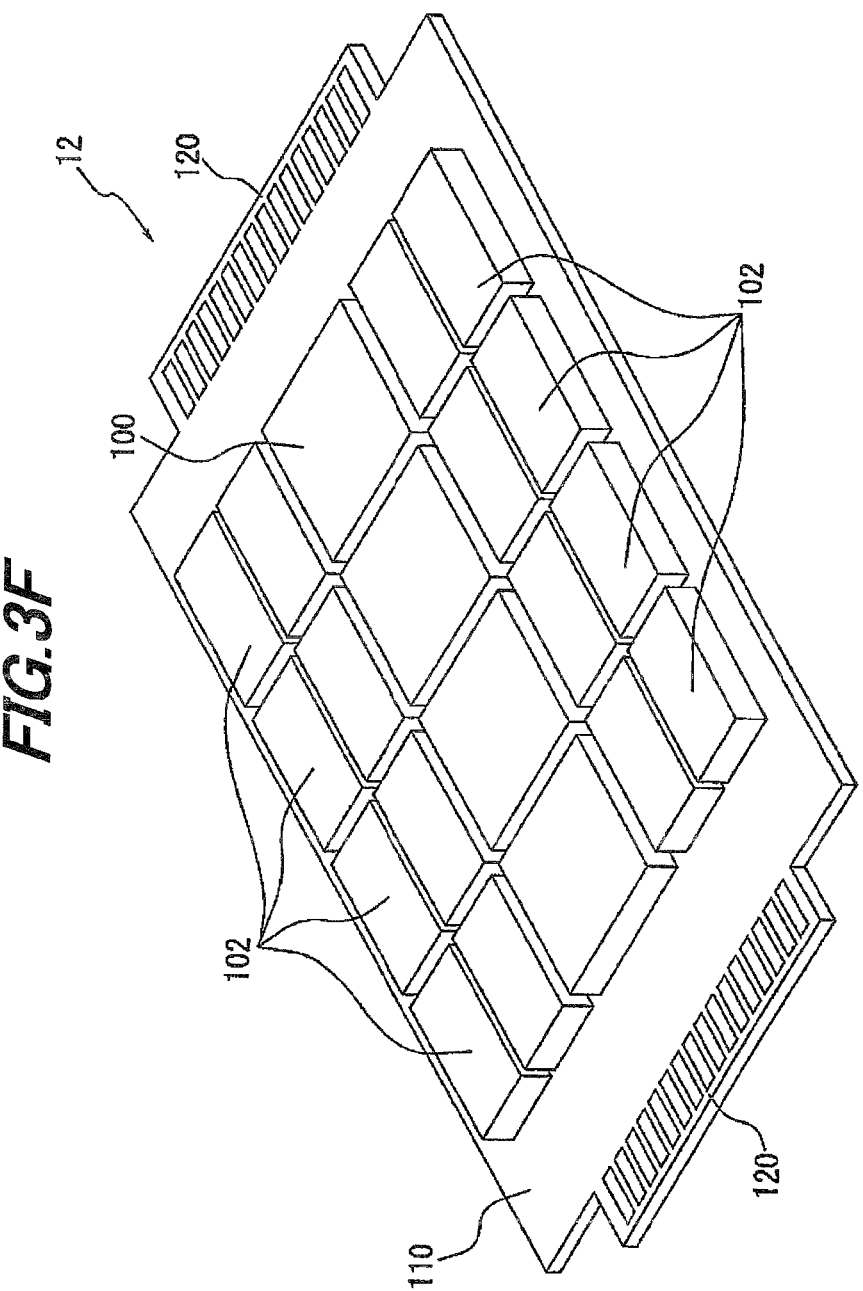
FIG. 3F is a perspective view showing a radiation detecting substrate included in the radiation detector module, from which flexible substrates have been removed, in the embodiment according to the invention.
Figure 3G:
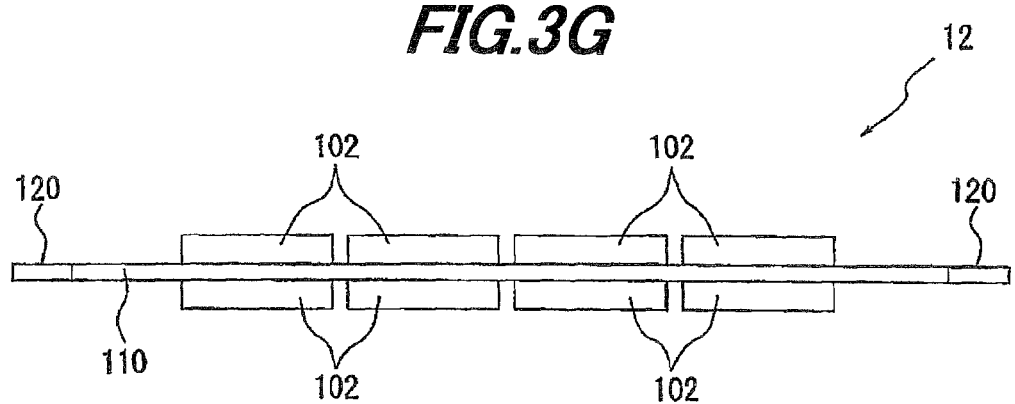
FIG. 3G is a side view showing the radiation detecting substrate of FIG. 3F included in the radiation detector module, from which flexible substrates have been removed, in the embodiment according to the invention.

FIG. 3F shows one example of a perspective view showing a radiation detecting substrate included in the radiation detector module, from which flexible substrates have been removed, in the embodiment according to the invention, and FIG. 3G shows one example of a side view showing the radiation detecting substrate included in the radiation detector module, from which flexible substrates have been removed, in the embodiment according to the invention.

The radiation detecting substrate 11 and/or 12 (herein, also referred to as the second radiation detecting substrates) is disposed farther from the incident radiation side than the first radiation detecting substrate 10. For example, as having been shown in FIG. 2B, the radiation detecting substrates 10, 11 and 12 are arranged in this order from the incident radiation side. The radiation detecting substrate 11 and/or 12 is then provided with a plurality of semiconductor devices (e.g. semiconductor devices 102) smaller sized in a plan view than the semiconductor devices mounted on the radiation detecting substrate 10 (e.g. semiconductor devices 100).

In FIGS. 3F and 3G, one example for the radiation detecting substrate 12 is shown. The radiation detecting substrate 12 has substantially the same structure as the radiation detecting substrate 10, except the size of the semiconductor devices to be mounted on the radiation detecting substrate 12 being different from the size of the semiconductor devices mounted on the radiation detecting substrate 10.

Specifically, the radiation detecting substrate 12 is provided with the semiconductor devices 102 smaller sized in a plan view than the semiconductor devices 100 mounted on the radiation detecting substrate 10. That is, when the first radiation detecting substrate (e.g. radiation detecting substrate 10) is arranged at a first position, and the second radiation detecting substrate (e.g. radiation detecting substrate 12) is arranged at a second position farther from the incident radiation side than the first position, the second radiation detecting substrate 12 is provided with the semiconductor devices smaller sized in a plan view than the semiconductor devices provided for the first radiation detecting substrate 10 arranged at the first position, i.e. the semiconductor devices with a transverse width narrower than that of the semiconductor devices provided for the first radiation detecting substrate 10 arranged at the first position. As for the second radiation detecting substrate 12, at least a portion of the semiconductor devices mounted on the second radiation detecting substrate 12 may be the semiconductor devices smaller sized in a plane view than the semiconductor devices provided for the first radiation detecting substrate 10 arranged at the first position.

Fixing Member 30

FIG. 4A shows one example of a perspective view showing a fixing member for the radiation detector module in the embodiment according to the invention, and FIG. 4R shows one example of a side view showing a fixing member for the radiation detector module in the embodiment according to the invention.

The fixing member 30 is formed to have a bottom 300 including a bottom plate 302, a first side wall 310, and a second side wall 320. The first side wall 310 and the second side wall 320 each then have a substrate supporting portion 330 for supporting each of the plural radiation detecting substrates, and a shielding material supporting portion 340 for supporting the shielding material 20. Here, the bottom 300, the first side wall 310, and the second side wall 320 may be formed to have an integral structure.

The fixing member 30 may be formed by use of a material to transmit more radiation than the shielding material 20. Specifically, it may be formed by injection molding or cutting work with good accuracy in dimensions, using a resin material such as polyphenylene sulfide resin (PPS), polyimide resin (PI), polyacetal resin (POM) or the like. Also, the fixing member 30 may be formed of a metal material such as aluminum, stainless steel or the like. When the fixing member 30 is formed of a resin, it is preferred that it is formed of PPS, in order to ensure the position accuracy of the plural radiation detecting substrates relative to the shielding material 20, and to ensure the mechanical strength of the fixing member 30.

The first side wall 310 and the second side wall 320 have mutually substantially the same structure and function, except that they are provided at one end or the other end, respectively, of the bottom 300. Herein is therefore described the first side wall 310. For the shielding material supporting portion 340, it should be noted, however, that, for convenience of description, there is described the shielding material supporting portion 340 provided for the second side wall 320.

The first side wall 310 includes a pillar 310a extending in a normal direction to the bottom plate 302 from one corner of the bottom plate 302, a beam 310d extending along the width of the bottom plate 302 including that one corner at its end, to interconnect with the tip of the pillar 310a, a pillar 310c extending to the bottom plate 302 from the other end of the beam 310d opposite one end of the beam 310d interconnecting with the pillar 310a, to interconnect with the bottom plate 302, and an intermediate portion 310b between the pillars 310a and 310c, extending from a middle region of the beam 310d to the surface of the bottom plate 302.

The substrate supporting portion 330 is defined as plural grooves in each of an intermediate portion 310b side surface of the pillar 310a, an intermediate portion 310b side surface of the pillar 310c, and pillar 310a and 310c side surfaces of the intermediate portion 310b. The substrate supporting portion 330 is then formed to include a flat supporting surface 330a along the outer surface of the radiation detecting substrate. As one example, the supporting surface 330a is formed to be parallel to the surface of the bottom plate 302.

The shielding material supporting portion 340 is provided on the opposite side of the beam 310d relative to the intermediate portion 310b provided thereon. The shielding material supporting portion 340 is formed to include a horizontal surface 340d relative to the bottom plate 302, and vertical surfaces 340a, 340b, and 340c relative to the horizontal surface 340d. The surfaces 340a and 340c are positioned opposite to each other, and the surface 340b is perpendicular to the surfaces 340a and 340c.

Circuit Substrates 40 and 42

Figure 5:
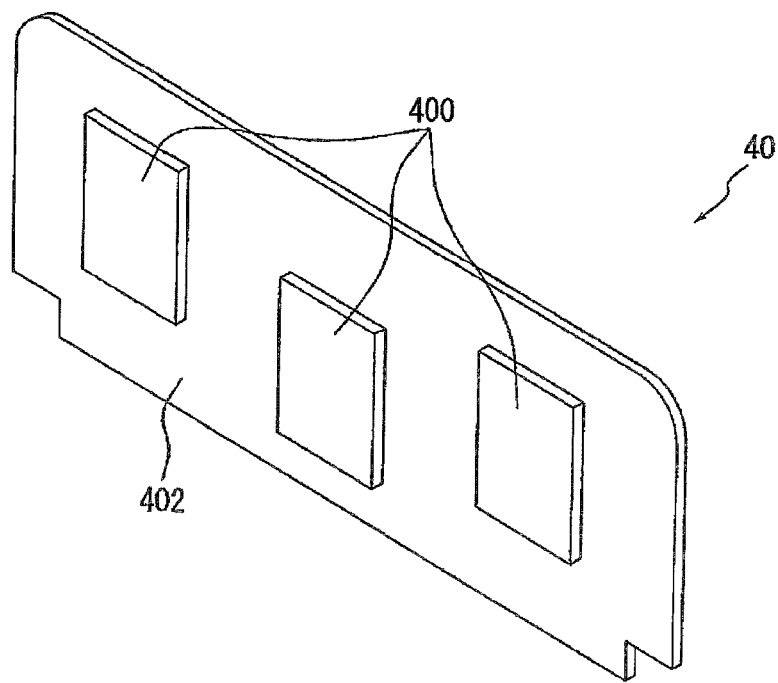
FIG. 5 is a perspective view showing a circuit substrate of the radiation detector module in the embodiment according to the invention.

FIG. 5 shows one example of a perspective view showing a circuit substrate of the radiation detector module in the embodiment according to the invention.

The circuit substrate 40 also referred to as the first circuit substrate has a plurality of integrated circuits 400 to be electrically connected to the plural semiconductor devices, and an insert end 402 to be inserted into the connector 55. The insert end 402 includes a plurality of terminals (not shown) to be electrically connected to the connector 55. Also, the circuit substrate 42 also referred to as the second circuit substrate has substantially the same structure and function as the circuit substrate 40. It should be noted, however, that the plural integrated circuits 400 on the first circuit substrate 40 are electrically connected to the plural first semiconductor devices (e.g. plural semiconductor devices 101), while the plural integrated circuits 400 on the second circuit substrate 42 are electrically connected to the plural second semiconductor devices (e.g. plural semiconductor devices 101 not electrically connected with the above plural first semiconductor devices 101). The circuit substrates 40 and 42 may each be fixed to the fixing member 30 by use of a screw or the like, for example.

Figure 6:
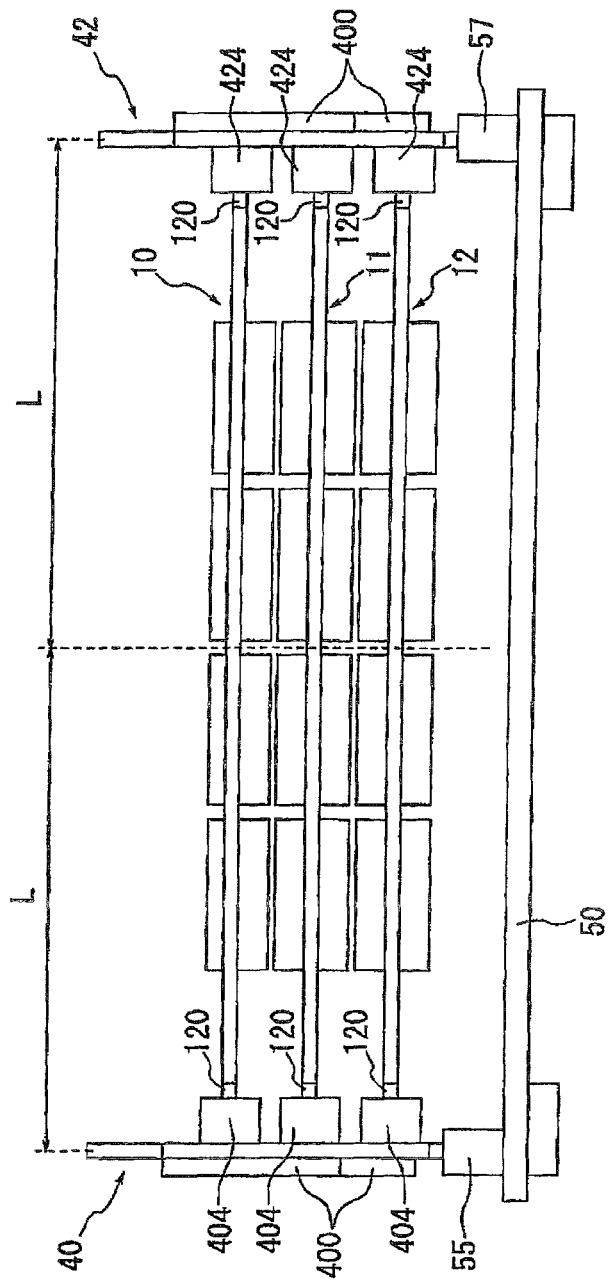
FIG. 6 is a side view showing the radiation detector module in the embodiment according to the invention.

FIG. 6 shows one example of a side view showing the radiation detector module in the embodiment according to the invention. In FIG. 6, for convenience of description, the shielding material 20, the fixing member 30, each flexible substrate, etc. are omitted and not illustrated.

The circuit substrate 40 is inserted into the connector 55 of the motherboard 50, while the circuit substrate 42 is inserted into a connector 57 of the motherboard 50. Further, the edge portions 120 at one end of the radiation detecting substrates 10, 11, and 12 are inserted into connectors 404 respectively of the circuit substrate 40, while the edge portions 120 at the other end of the radiation detecting substrates 10, 11, and 12 are inserted into connectors 424 respectively of the circuit substrate 42. The connectors 404 and 424 are provided on the opposite side of the circuit substrates 40 and 42 relative to the integrated circuits 400 provided on the circuit substrates 40 and 42 respectively.

Here, the plural semiconductor devices mounted on the plural radiation detecting substrates 10 to 12 are each electrically connected to either of the circuit substrate 40 or 42. The flexible substrates (not shown) are then electrically disconnected from each other in a middle portion of each of the radiation detecting substrates 10, 11, and 12, while being electrically connected to either of the circuit substrate 40 or 42. This construction allows the wiring length between each semiconductor device and the circuit substrate 40 or 42 to be not more than L (=½ the longitudinal length of each of the radiation detecting substrates 10, 11, and 12).

Side Wall of the Radiation Detector Module 1

Figure 7:
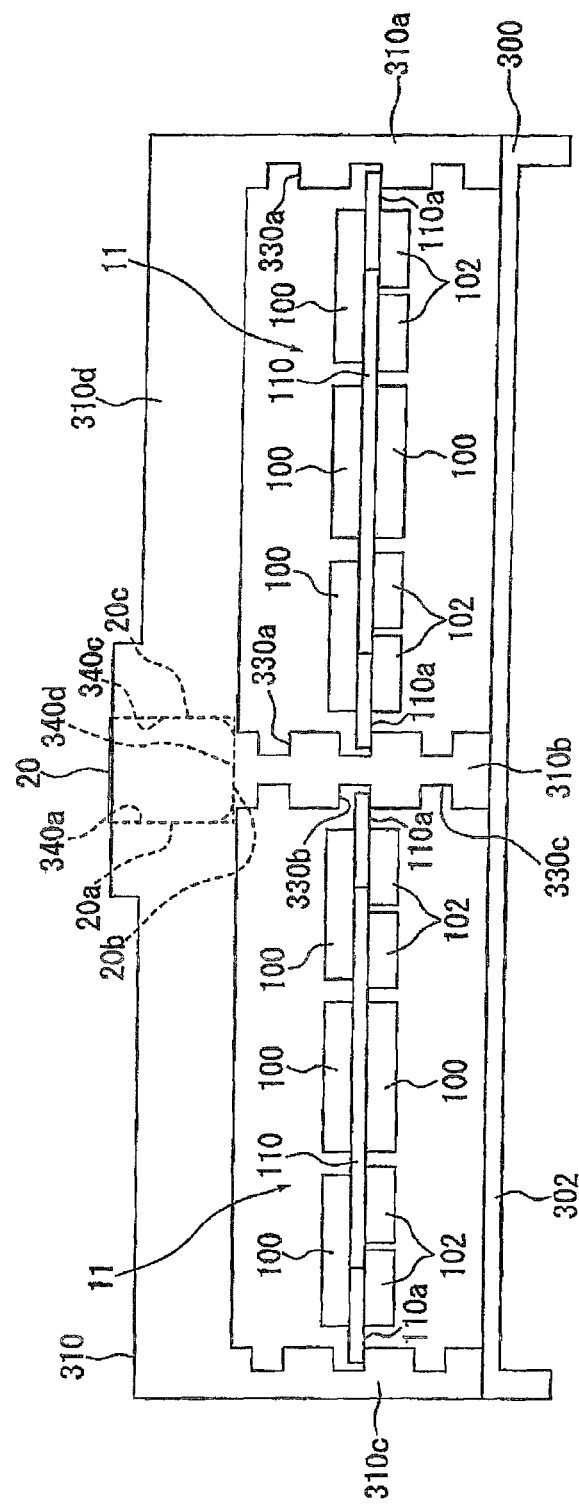
FIG. 7 is a schematic view showing a side wall of the radiation detector module in the embodiment according to the invention.

FIG. 7 is a schematic view showing a side wall of the radiation detector module 1 in the embodiment according to the invention.

In FIG. 7, for convenience of description, the circuit substrate 40, the radiation detecting substrate 10, the radiation detecting substrate 12, and the flexible substrates provided for the radiation detecting substrate 11 are omitted and not illustrated.

First, the substrate supporting portions 330 are each formed in a recessed shape when viewed from one side of the fixing member 30. That is, each substrate supporting portion 330 includes the supporting surface 330a, a supporting surface 330b opposite the supporting surface 330a, and a side portion 330c being perpendicular to and interconnecting with the supporting surfaces 330a and 330b. The substrate supporting portions 330 then support an adjacent edge of the radiation detecting substrate 11. Specifically, when the radiation detecting substrate 11 is inserted into the substrate supporting portions 330, a substrate surface 110a of the radiation detecting substrate 11 is contacted with the supporting surface 330a, thereby the radiation detecting substrate 11 being supported by the substrate supporting portions 330. One substrate supporting portion 330 is set to have a distance between its supporting surfaces 330a and 330b of not less than the thickness of the radiation detecting substrate 11.

Also, the shielding material supporting portion 340 is contacted with a flat surface 20a of the shielding material 20 at its surface 340a, a flat surface 20c of the shielding material 20 at its surface 340c, and a flat surface 20b of the shielding material 20 at its surface 340d, thereby supporting the shielding material 20. That is, the respective positions of the surfaces 340a, 340c and 340d of the shielding material supporting portion 340 are controlled relative to the fixing member 30, thereby allowing the shielding material 20 to be controlled at a precise position relative to the fixing member 30, and supported by the shielding material supporting portion 340.

Angle Resolution of the Radiation Detector Module 1

Figure 8:
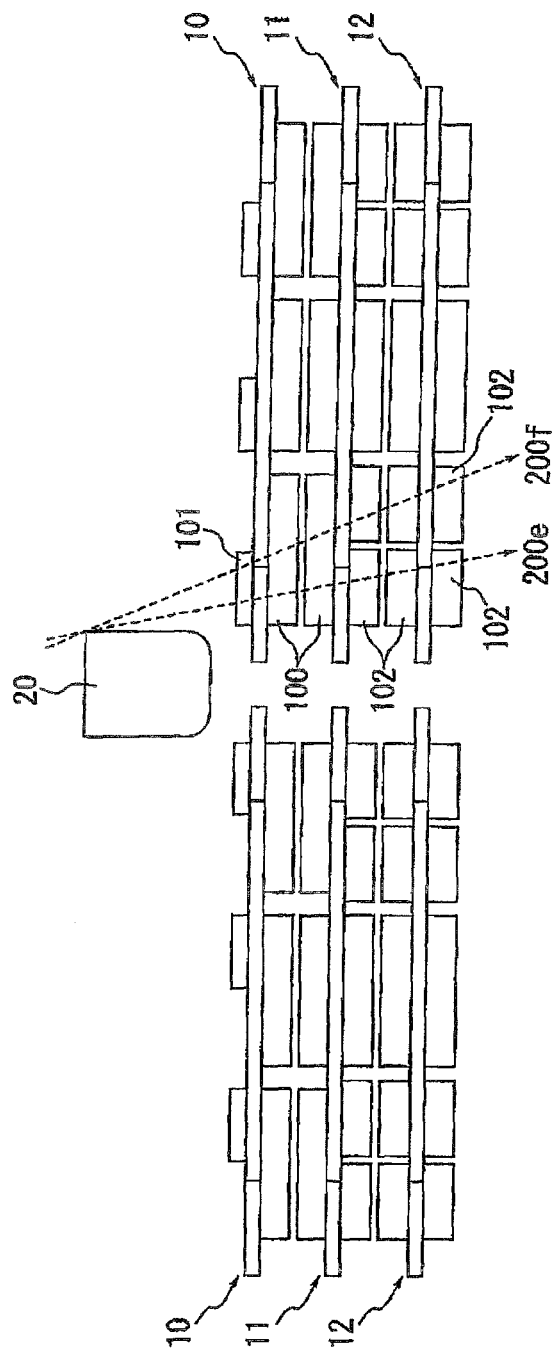
FIG. 8 is a schematic view showing the angle resolution of the radiation detector module in the embodiment according to the invention.

FIG. 8 is a schematic view showing the angle resolution of the radiation detector module 1 in the embodiment according to the invention.

In FIG. 8, for convenience of description, the fixing member 30, the circuit substrate 40, the circuit substrate 42, each flexible substrate, etc. are omitted and not illustrated.

The shielding material 20 is for shielding radiation from outside. Accordingly, at semiconductor devices positioned in the shade of the shielding material 20, no radiation is detected. This therefore allows a position of a radiation source to be specified from a radiation receiving count ratio of semiconductor devices having detected radiation and semiconductor devices having detected no radiation, and an incident angle of that radiation.

Here, in this embodiment, the semiconductor devices 102 disposed far from the incident radiation side are smaller sized in a plan view than the semiconductor devices 100 disposed near to the incident radiation side. This allows the enhancement of the incident angle resolution of radiation incident on the radiation detector module 1. As shown in FIG. 8, in this embodiment, the plural radiation detecting substrates 10 to 12 are stacked at a specified pitch. This results in a stacked structure of the semiconductor devices 100 to 102 in a plan view. It is therefore possible to facilitate the computing of a scattered radiation angle, and the acquisition of data required for the scattered radiation computing.

Modification to the Embodiment

FIG. 9 is a schematic side view showing a radiation detector module in a modification to the embodiment according to the invention. In FIG. 9, for convenience of description, the shielding material 20, the fixing member 30, the circuit substrate 40, the circuit substrate 42, each semiconductor device, each flexible substrate, etc. are omitted and not illustrated.

In the radiation detector module in the modification to this embodiment, a motherboard 50 side end of a circuit substrate 44 is inserted in a connector 59 provided in a substantially middle portion of the motherboard 50. The fixing member 30 is attached to on the motherboard 50 in such a manner that, when the circuit substrate 44 is taken as the center, the first side wall 310 of the fixing member 30 is positioned at a specified distance from one side of the circuit substrate 44, while the second side wall 320 of the fixing member 30 is positioned at a specified distance from the other side of the circuit substrate 44.

Each of one surface and the other surface of the circuit substrate 44 is then provided with a plurality of circuit substrate 44 side connectors 440 in which are inserted the radiation detecting substrates 10, 11 and 12 respectively. In the plural connectors 440 are then inserted the edge portions 120 of the radiation detecting substrates 10, 11 and 12 respectively. The radiation detecting substrates 10, 11 and 12 are inserted into the connectors 440 along the substrate supporting portions 330 respectively of the fixing member 30. This results in the radiation detector module in the modification. In the modification, the integrated circuits 400 and an FPGA 410 are mounted on the opposite side of the motherboard 50 to the connector 59 provided thereon.

Effects of the Embodiment

The radiation detector module 1 in this embodiment is constructed such that the radiation detecting substrates 10 to 12 can be inserted by sliding into the substrate supporting portions 330 respectively provided in the fixing member 30, thereby allowing the radiation detecting substrates 10 to 12 to easily be held by the fixing member 30. This can aid in constructing the radiation detector module 1, and allows only the desired radiation detecting substrates 10 to 12 to be inserted into or removed from the substrate supporting portions 330 at desired positions respectively. It is therefore possible to provide the radiation detector module 1 with excellent assembling capability.

Also, the radiation detector module 1 in this embodiment is constructed such that, through the flexible substrates electrically divided in the substantially middle in the longitudinal direction of each of the radiation detecting substrates 10 to 12, the plural semiconductor devices mounted on the radiation detecting substrates 10 to 12 can be each electrically connected to either of the circuit substrate 40 or 42. Accordingly, in the radiation detector module 1, the wiring length between each semiconductor device and the circuit substrate 40 or 42 can be reduced to at least not more than ½ the longitudinal length of each of the radiation detecting substrates 10 to 12. It is therefore possible to provide the radiation detector module 1 with high sensitivity.

Also, the radiation detector module 1 allows a portion of incident radiation to be shielded by the shielding material 20 formed of a material having a good radiation shielding property, in order to form a region on the radiation detecting substrates being not penetrated by that radiation (i.e. a shadow of that radiation). It is therefore possible to make the design of a small sized radiation detector module easier than the conventional art.

Also, the radiation detector module 1 is constructed such that the radiation detecting substrates 10 to 12 and the shielding material 20 are supported by the fixing member 30 formed of a resin or metal material with a poorer radiation shielding property than the shielding material 20. It is therefore possible to inhibit the fixing member 30 from shielding radiation, and thereby enhance the angle resolution and ensure a large viewing angle.

Further, the radiation detector module 1 is constructed such that the fixing member 30 is formed of a resin or metal material to be easily subjected to precision work. It is therefore possible to control the plural radiation detecting substrates 10 to 12 at a precise position relative to the shielding material 20. This makes it possible to easily enhance the angle resolution of the radiation detector module 1.

Although the invention has been described with respect to the above embodiments, the above embodiments are not intended to limit the appended claims. Also, it should be noted that not all the combinations of the features described in the above embodiments are essential to the means for solving the problems of the invention.

What is claimed is:

1. A radiation detector module, comprising:
a radiation detecting substrate comprising a plurality of semiconductor devices mounted thereon for detecting radiation, the plural semiconductor devices each comprising a first electrode on one surface thereof and a second electrode on an other surface thereof;
a fixing member for holding the radiation detecting substrate; and
a circuit substrate connected to the radiation detecting substrate, wherein:
the radiation detecting substrate further comprises: a mounting board comprising an edge portion connected to the circuit substrate at one end thereof, the plurality of semiconductor devices being connected to the mounting board via the first electrode; and a flexible substrate comprising a wiring pattern connected to the second electrode of the plurality of semiconductor devices,
the fixing member comprises: a bottom; a first side wall extending in a normal direction to the bottom from one end of the bottom; a second side wall extending in the normal direction to the bottom from the other end of the bottom; and substrate supporting portions on the first side wall and the second side wall, respectively, the substrate supporting portions supporting the radiation detecting substrate,
the circuit substrate is electrically connected to the plurality of semiconductor devices via the edge portion of the radiation detecting substrate,
the plurality of semiconductor devices are arranged at intervals along one side of the mounting board and an other side perpendicular to the one side in top view,
the circuit substrate comprises a first circuit substrate and a second circuit substrate connected to both ends, respectively, of the radiation detecting substrate,
the mounting board includes a first edge portion connected to the first circuit substrate at one end of the mounting board, and a second edge portion connected to the second circuit substrate at an other end of the mounting board,
the plurality of semiconductor devices comprise a plurality of first semiconductor devices electrically connected to the first edge portion, and a plurality of second semiconductor devices electrically connected to the second edge portion,
the flexible substrate comprises a first flexible substrate connected to the plurality of first semiconductor devices, and a second flexible substrate connected to the plurality of second semiconductor devices,
the first circuit substrate includes an integrated circuit electrically connected to the plurality of first semiconductor devices, the second circuit substrate includes an integrated circuit electrically connected to the plurality of second semiconductor devices, and
the radiation detecting substrate is disposed between the first circuit substrate and the second circuit substrate.

2. The radiation detector module according to claim 1, wherein
the plurality of first semiconductor devices and the plurality of second semiconductor devices are being electrically disconnected from each other.

3. The radiation detector module according to claim 2, wherein
the fixing member further includes:
a shielding material provided at a position nearer to an incident side of the radiation than the radiation detecting substrate, the shielding material capable of shielding the radiation; and
a shielding material supporting portion provided at a predetermined position relative to the substrate supporting portion and for supporting the shielding material.

4. The radiation detector module according to claim 1, wherein the circuit substrate includes a circuit substrate side connector on each of one side and the other side thereof, and the edge portion of the radiation detecting substrate is inserted in the circuit substrate side connectors.

5. The radiation detector module according to claim 4, wherein the fixing member comprises a resin or metal material.

* * * * *